United States Patent [19]
Neti

[11] Patent Number: 5,619,701
[45] Date of Patent: Apr. 8, 1997

[54] METHOD AND SYSTEM FOR ADAPTER CONFIGURATION IN A DATA PROCESSING SYSTEM

[75] Inventor: Chalapathy Neti, Boca Raton, Fla.

[73] Assignee: International Business Machines Corporation, Armonk, N.Y.

[21] Appl. No.: 631,743

[22] Filed: Apr. 4, 1996

Related U.S. Application Data

[63] Continuation of Ser. No. 824,431, Jan. 23, 1992, abandoned.

[51] Int. Cl.$^6$ .................................................. G06F 9/00
[52] U.S. Cl. ........................ 395/674; 395/800; 395/651; 364/240; 364/286.2; 364/257.2; 364/926.9; 364/DIG. 1
[58] Field of Search .............................................. 395/600

[56] References Cited

U.S. PATENT DOCUMENTS

| | | | |
|---|---|---|---|
| 4,803,623 | 2/1989 | Klashka et al. .................. | 395/275 |
| 5,138,706 | 8/1992 | Melo et al. ...................... | 395/500 |
| 5,161,102 | 11/1992 | Griffin et al. .................... | 395/800 |

*Primary Examiner*—Kevin A. Kriess
*Assistant Examiner*—Lucien Toplu

*Attorney, Agent, or Firm*—Mark S. Walker; Andrew J. Dillon

[57] ABSTRACT

A method and system for sequence independent configuration of adapters installed in a data processing system. Adapters such as disk drive controllers, Token Ring adapters, terminal emulators and the like each include multiple choices associated therewith which specify selected memory allocations which must be utilized in configuring the adapters. A determination is first made of the number of possible combinations of such choices which exist, and if that number is not substantial, an exhaustive evaluation of each possible combination is made to determine if a conflict exists. In the absence of a conflict, each combination is examined for an optimum allocation of memory which maximizes the number of sixteen kilobyte free memory pages remaining within the system memory after configuration for utilization by an expanded memory system. If the number of possible combinations exceeds a predetermined number, only a predetermined number of random combinations are evaluated and an optimum allocation is selected from those random combinations. In order to minimize the probability of chosing combinations with conflicts arising from system utilization of duplicate adapters, a random choice for each successive adapter is selected which, with a high degree of probability, is not identical to a choice selected for a previous adapter.

20 Claims, 3 Drawing Sheets

METHOD AND SYSTEM FOR ADAPTER CONFIGURATION IN A DATA PROCESSING SYSTEM

This is a continuation of application Ser. No. 07/824,431, filed 23 Jan. 1992 now abandoned.

BACKGROUND OF THE INVENTION

1. Technical Field:

The present invention relates in general to improvements in data processing systems and in particular to methods and systems for optimizing system resource allocation within a data processing system. Still more particularly, the present invention relates to a method and system for allocating system memory during adapter configuration in order to maximize the number of sixteen kilobyte free memory pages remaining within system memory for utilization by an expanded memory system.

2. Description of the Related Art:

Modem state-of-the-art personal computers, such as the International Business Machines Corporation Personal System/2 are capable of interfacing with a large number of other devices utilizing so-called "adapters" which electrically interconnect with a personal computer utilizing expansion slots or bus connections. Examples of known adapters include: disk drive controllers, such as Small Computer System Interface (SCSI) controllers and Enhanced Small Device Interface (ESDI) controllers; Terminal Emulator Adapters, such as 3270A and 3270B; Motorway Cards; and, Token Ring Cards.

Each of the above-referenced adapters includes various specifications which are generally set forth in an Adapter Description File (ADF). The Adapter Description File includes a plurality of configuration choices which specify the preferred memory address ranges in ROM or RAM, which are required to configure a data processing system for a selected adapter. Certain adapters may include over thirty choices and therefore, those skilled in the art will appreciate that the configuration of a large number of adapters will result in a very large number of possible combinations which must be evaluated in order to optimize allocation of system resources. This is particularly true in data processing systems which utilize expanded memory as specified by the Lotus/Intel Expanded Memory Specification (EMS), which requires the configuration to maximize the number of available sixteen kilobyte free memory pages which will be available for utilization by the expanded memory system.

Existing systems permit the automatic configuration of adapters; however, such systems are highly sequence dependent and, due to the large number of possible combinations, are very time consuming. For example, studies have shown that for selected sequences of adapter cards automatic configuration may take almost one hour. Most of that time is occupied by the requirement that the configuration satisfy the requirements of the enhanced Lotus/Intel Expanded Memory Specification (EMS). The EMS requirement involves the finding of a conflict free configuration which results in a maximum number of sixteen kilobyte free memory pages in the 0C0000(Hex) and 0D0000(Hex) memory segments.

The process followed for this requirement first finds a conflict free configuration from the choices set forth within the aforementioned Adapter Description File and thereafter determines the amount of free memory in the 0C0000(Hex) and 0D0000(Hex) segments. Utilizing this amount of free memory as a starting point, for each possible position of free memory aligned on a sixteen kilobyte boundary, a conflict free configuration is searched for. If a conflict free configuration is not found, free memory is decremented by four kilobytes and the process repeats until an amount of free memory is found which is greater than or equal to sixteen kilobytes. The order of memory item configuration is continually permuted and the possible choices are all evaluated until a conflict free configuration is found. The worst case number of combinations which must be evaluated utilizing this approach may be expressed as follows:

$$C = \sum_{i=0}^{N} \frac{128 - (\text{freemem} - 4 \times i)}{16} \times$$

$$m! \times (1 + n_1 + \ldots + n_m)$$

where N=freemen−16/4, is the number of memory items and $n_1, \ldots n_m$ are the number of choices for each memory item. As those skilled in the an will appreciate, this technique possesses very poor scaling properties by virtue of its dependence upon the factorial of the number of memory items defined and the procedure is sequence dependent since the starting order of the memory items is dependent upon the sequence of the configuration of the adapters.

Thus, it should be apparent to those skilled in the art that a need exists for a more efficient method and system for optimizing memory allocation during adapter configuration in a data processing system.

SUMMARY OF THE INVENTION

It is therefore one object of the present invention to provide an improved data processing system.

It is another object of the present invention to provide an improved method and system for optimizing system resource allocation within a data processing system.

It is yet another object of the present invention to provide an improved method and system for allocating system memory during adapter configuration in order to maximize the number of sixteen kilobyte free memory pages remaining within system memory after configuration for utilization by an expanded memory system.

The foregoing objects are achieved as is now described. A method and system are disclosed for sequence independent configuration of adapters installed in a data processing system. Adapters such as disk drive controllers, Token Ring adapters, terminal emulators and the like each include multiple choices associated therewith which specify selected memory allocations which must be utilized in configuring the adapters. A determination is first made of the number of possible combinations of such choices which exist, and if that number is not substantial, an exhaustive evaluation of each possible combination is made to determine if a conflict exists. In the absence of a conflict, each combination is examined for an optimum allocation of memory which maximizes the number of sixteen kilobyte free memory pages remaining within the system memory after configuration for utilization by an expanded memory system. If the number of possible combinations exceeds a predetermined number, only a preselected number of random combinations are evaluated and an optimum allocation is selected from those random combinations. In order to minimize the probability of choosing combinations with conflicts arising from system utilization of duplicate adapters, a random choice for each successive adapter is selected which, with a high degree of probability, is not identical to a choice selected for a previous adapter.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
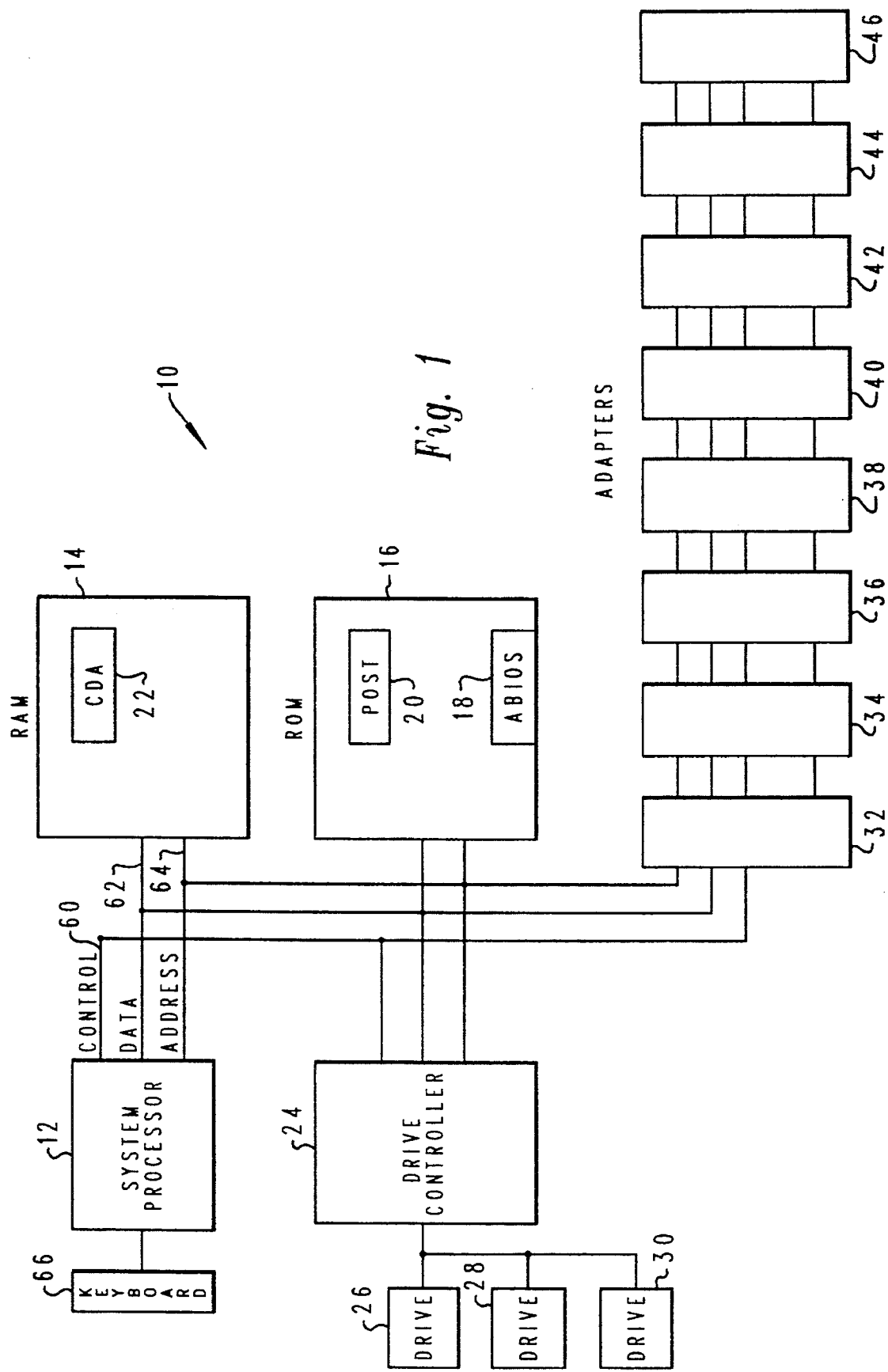
FIG. 1 is a high level block diagram of a computer system which may be utilized to implement the method and system of the present invention.

With reference now to the figures and in particular with reference to FIG. 1, there is depicted a high level block diagram of a computer system 10 which may be utilized to implement the method and system of the present invention. As illustrated, computer system 10 typically includes a system processor 12 which is coupled to a display device (not shown) and a keyboard 66. Additionally, coupled to system processor 10 by means of control bus 60, data bus 62 and address bus 64, are Random Access Memory RAM 14 and Read Only Memory ROM 16. Also coupled to processor 12 via control bus 60, data bus 62 and address bus 64 are various adapters 32, 34, 36, 38, 40, 42, 44, and 46. Those skilled in the art will appreciate that such adapters may be utilized to accommodate various peripheral devices which may be coupled to processor 12, utilizing well-known expansion slots or adapters.

Upon reference to the foregoing those skilled in the art will appreciate that data processing system 10 may be implemented utilizing any so-called "personal computer," such as the International Business Machines Corporation Personal System/2 computer.

Depicted within Read Only Memory ROM 16 are selected code sections which are typically stored within Read Only Memory ROM 16 in order to assure the availability of such codes at all times for data processing system 10. In a manner well known to those skilled in the art, a Power On System Test (POST) code 20 is typically resident with Read Only Memory ROM 16 for a data processing system and is utilized to initialize data processing system 10 in a deterministic manner in order to provide a predictable and repeatable software environment. Among other tasks Power On System Test (POST) code 20 establishes an order within the disk storage devices and other peripherals which are coupled to data processing system 10.

As depicted within FIG. 1, data processing system 10 may also include a multitude of disk storage devices. For example, a disk drive controller 24 may be provided and may be utilized to support a plurality of fixed disk drives 26, 28 and 30, by coupling disk drive controller 24 directly to control bus 60, data bus 62 and address bus 64. Additionally, various other disk drive controllers may be coupled to data processing system 10 via the available adapters or expansion slots, such as adapters 32–46.

Also depicted within Read Only Memory ROM 16 is Advanced Basic Input/Output System (ABIOS) code 18, which is typically utilized by computer system 10 to provide device independence to an operating system. Within a computer system utilizing an Advanced Basic Input/Output System (ABIOS), fixed disk storage device ordering is generally represented to the operating system by the position of a logical identification assigned to each fixed disk storage device in accordance with the ordering accomplished by Power On System Test (POST) code 20 and stored within a Common Data Area (CDA) 22, as depicted within Random Access Memory RAM 14.

Figure 2:
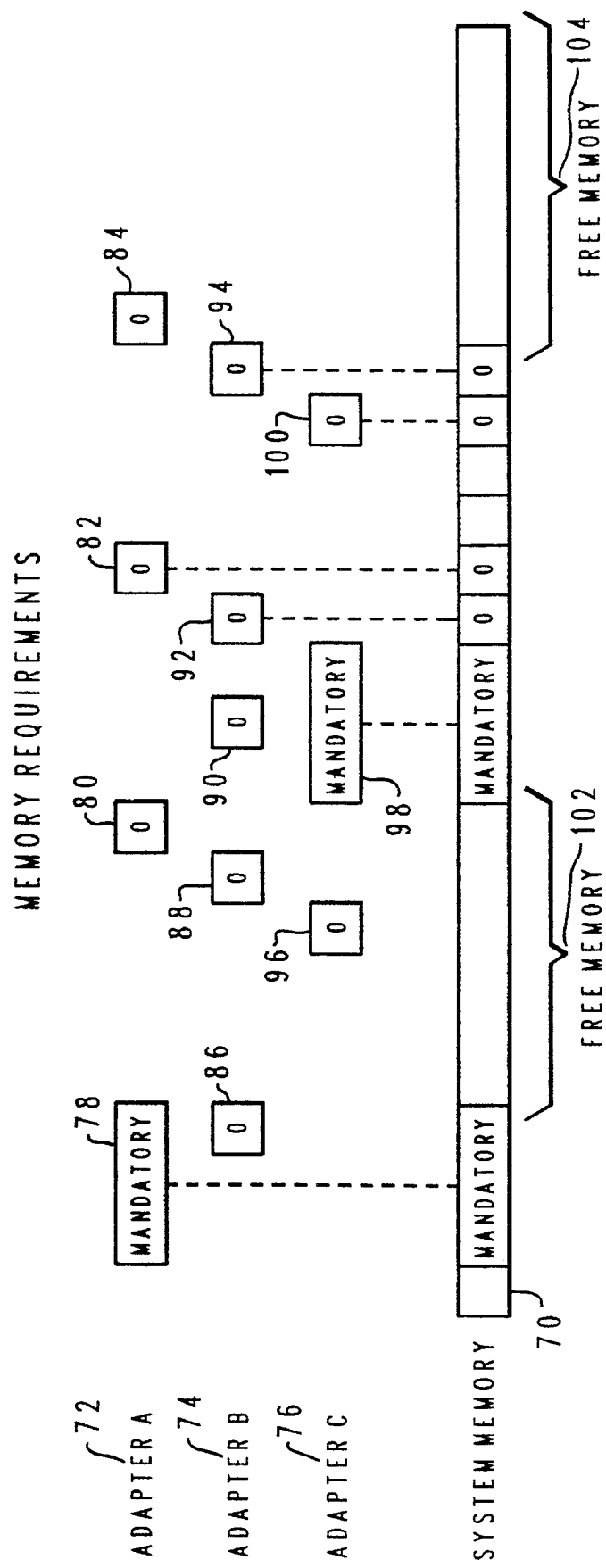
FIG. 2 is a schematic representation of memory allocation for multiple adapters within a data processing system.

Referring now to FIG. 2, there is depicted a schematic representation of memory allocation for multiple adapters within a data processing system which may be utilized to illustrate the method and system of the present invention. As illustrated within FIG. 2, system memory is schematically represented at reference numeral 70. Multiple adapters 72, 74 and 76 are graphically depicted as including various memory requirements as set forth within the adapter description file associated with each adapter. Thus, adapter A, indicated at reference numeral 72, includes a mandatory memory requirement 78 and optional memory requirements 80, 82, and 84. Similarly, adapter B, indicated at reference numeral 74 includes optional memory requirements as indicated at reference numerals 86, 88, 90, 92, and 94. Finally, adapter C, indicated at reference numeral 76, includes optional memory requirements as indicated at reference numerals 96 and 100 and a mandatory memory requirement indicated at reference numeral 98. Thus, upon reference to this schematic representation, those skilled in the art will appreciate that optional memory requirement 86 associated with adapter B is a conflict with mandatory memory requirement 78 associated with adapter A. Similarly, the optional memory requirement indicated at reference numeral 90 is in conflict with mandatory memory requirement 98 for adapter C.

Upon a review of the foregoing, those skilled in the art will appreciate that there are multiple combinations of choices of memory allocation for the simple example set forth within FIG. 2 and that certain of these combinations of choices may result in a conflict in the memory allocation. Further, as set forth above in the description of the Lotus/Intel Expanded Memory Specification (EMS), the allocation of memory is preferably a configuration which is conflict free while resulting in the maximum number of sixteen kilobyte free memory pages in the 0C0000(Hex) and 0D0000(Hex) memory segments. Thus, it may be seen that by selecting mandatory memory segment 78, mandatory memory segment 98, optional memory segment 92, optional memory segment 82, optional memory segment 100 and optional memory segment 94 two large areas of free memory within system memory 70 are created. That is, free memory segment 102 and free memory segment 104. Additionally, free memory is present between optional memory segment 82 and optional memory segment 100; however, if that free memory segment is less than a sixteen kilobyte segment, it is not utilizable by an expanded memory system and is therefore not considered in this explanation.

Upon reference to FIG. 2, those skilled in the art will appreciate that when utilizing a large number of adapters in a personal computer, each adapter having a large number of possible choices for memory allocation utilizable by that adapter, the number of combinations which must be considered can grow to an extremely large number. Due to the discrete nature of the search space (it is limited to those choices defined within the Adapter Description Files (ADF)) an exhaustive search for an optimal solution (which is based directly upon the defined choices) will result in a sequence independent configuration. However, the number of choices for each memory item defined within the adapter description files can result in an extremely expensive search in terms of processor assets and time.

The Applicant has discovered that this problem may be partitioned into two broad cases. That is, where the number of cards and/or choices is small, the number of combinations to be searched is relatively small and the probability of a large amount of free memory space being available is much higher. Thus, an exhaustive search, as typically accomplished in the prior art, is relatively inexpensive and may be utilized to find the optimum allocation of system resources.

Alternately, when the number of adapter cards to be configured is quite large and a large number of memory item choices are defined, the number of combinations to be evaluated for an exhaustive search is quite expensive in terms of time and processor assets. However, with a high probability the amount of remaining free memory after such allocation is quite small and is nearly equal to the granularity of memory choices. Thus, any conflict free configuration is likely to be optimal, implying that a large number of optimal solutions exist.

Thus, as will be explained in greater detail below, a random search is carried out through a fixed number of combinations of choices and the results of that random search are then evaluated, resulting in a solution which is, with a high degree of probability, optimal. In the depicted embodiment of the present invention, if the number of combinations of choices is less than 8,800, an exhaustive search is accomplished utilizing a tree datastructure to enumerate possible combinations and locate an optimum allocation of memory for configuration.

Alternately, if the number of combinations exceeds this predetermined number, a random search is accomplished a predetermined number of times. In the depicted embodiment of the present invention, a random search is utilized 8,800 times. In this manner, the number of combinations which must be evaluated in all circumstances is limited to less than 8,800. Additionally, in order to minimize the number of conflicting combinations which may occur due to the utilization of identical adapter cards, the random selection from each adapter card is selected such that, with a high probability, the random choice for a particular adapter will not be repeated for a second or subsequent adapter. Thus, the probability of chosing a conflicting combination arising as a result of selecting the same choice within two identical adapters is minimized.

Empirical testing of this approach has resulted in findings that show an enhanced speed for configuration time by a factor of up to 162.85 when the amount of free memory remaining is twenty-four kilobytes.

Figure 3:
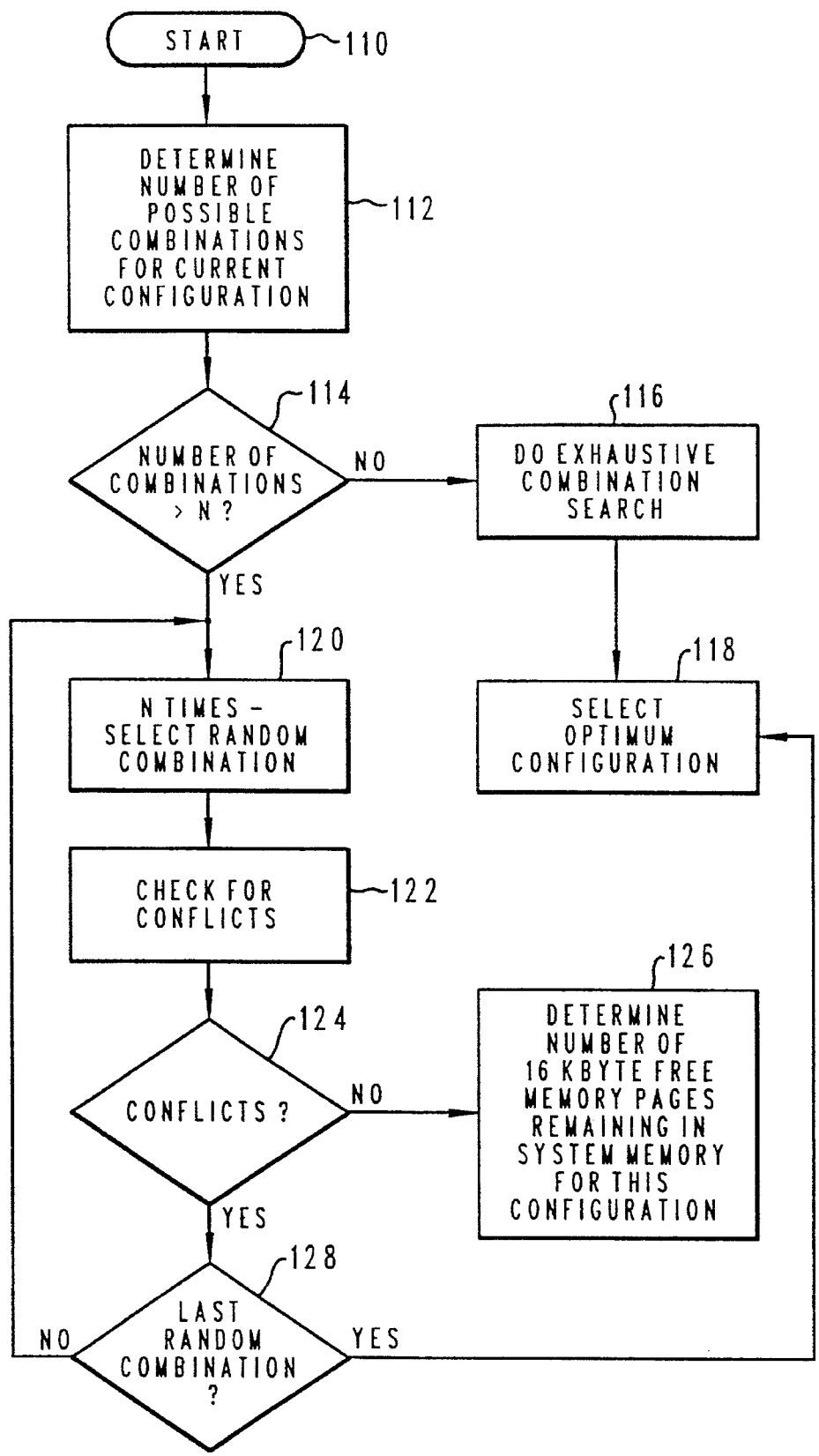
FIG. 3 is a high level logic flowchart illustrating a software implementation of the method and system of the present invention.

With reference now to FIG. 3, there is depicted a high level logic flowchart which illustrates a software implementation of the method and system of the present invention. As illustrated, the process begins at block 110 and thereafter passes to block 112. Block 112 illustrates a determination of the number of possible combinations of choices for the current configuration of adapter cards. Thereafter, the process passes to block 114.

As illustrated at block 114, a determination is made whether or not the number of possible combinations exceeds a predetermined number "N." In the depicted embodiment of the present invention, "N" is set to equal 8,800. This number has been empirically determined and a greater or lesser number may be utilized without departing from the spirit and intent of the present invention. If the number of combinations does not exceed this predetermined number, the process passes to block 116. Block 116 illustrates an exhaustive combination search for all possible combinations of choices for the current configuration. Thereafter, the process passes to block 118 which illustrates the selection of an optimum configuration from those possible combinations. As set forth above, an optimum configuration is a configuration which results in a maximum number of sixteen kilobyte pages of free memory remaining within the system memory for utilization by an expanded memory system.

Referring again to block 114, in the event the number of possible combinations is greater than the predetermined number, the process passes to block 120. Block 120 depicts the selection of a random combination of choices "N" times. Of course, those skilled in the art will appreciate that the selection of "N" different random combinations is merely a design choice and a number greater than or less than the predetermined number of combinations may also be utilized. For each random combination selected, as illustrated at block 120, the process passes to block 122 which illustrates a checking for possible conflicts. That is, a memory allocation for a first adapter which conflicts with a memory allocation chosen for a second adapter.

Thereafter, the process passes to block 124. Block 124 illustrates a determination of whether or not a conflict between required memory allocations for different adapters exists, and if not, the process passes to block 126. Block 126 illustrates the determination of the number of sixteen kilobyte free memory pages available after allocation for this particular combination of choices and that information is then stored.

Referring again to block 124, in the event a conflict between memory allocation choices does exist, or in the event no conflict exists and after determining the number of sixteen kilobyte free memory pages remaining within system memory after this particular combination of choices is made, the process passes to block 128. Block 128 illustrates a determination of whether or not the combination of choices evaluated is the last random combination and if not, the process returns to block 120 to select a second random combination. As described above, the selection of a random combination is preferably guided such that the selection of a particular choice for a selected adapter is, with a high degree of probability, not equal to the same choice for a previous adapter. This technique has been chosen in order to minimize the number of possible conflicts which may arise as a result of utilizing duplicate adapter cards within the same computer.

Referring again to block 128, in the event the last random combination of choices has been selected, the process passes again to block 118. Block 118 now illustrates the selecting of the optimum configuration from the random number of combinations of choices which have been evaluated. The selection of an optimum choice, in this example, is the configuration which results in the largest number of sixteen kilobyte free memory pages remaining within system memory, after configuration, as determined at block 126.

Thus, those skilled in the art will appreciate that the process of allocating memory during adapter configuration has been bifurcated into a two step process. If the number of possible combinations is not substantial, an exhaustive combination search is performed and the optimum configuration for each of those combinations is selected. Alternately, in the event a large number of combinations is possible, random selections of combinations of choices are evaluated and the optimum configuration for this situation is selected from only those random combinations which have been evaluated. In this manner, the amount of time required to automatically configure a data processing system with multiple adapters may be substantially reduced without diminishing the probability that an optimum configuration has been selected.

While the invention has been particularly shown and described with reference to a preferred embodiment, it will be understood by those skilled in the art that various changes in form and detail may be made therein without departing from the spirit and scope of the invention.

I claim:

1. A method of configuring a data processing system to optimally allocate system resources among a plurality of adapters installed therein, each of said plurality of adapters having a plurality of choices associated therewith specifying selected system resources utilizable by an associated adapter, said method comprising the steps of:

determining the maximum number of possible combinations of choices for all of said plurality of adapters;

examining only a selected portion of said maximum number of possible random combinations of choices in response to said maximum number of possible combinations of choices exceeding a predetermined large number;

analyzing said selected portion of said maximum number of possible random combinations of choices; and selecting an optimum allocation of system resources from said selected portion of said maximum number of possible random combinations of choices.

2. The method of configuring a data processing system to optimally allocate system resources among a plurality of adapters installed therein according to claim 1, further including the step of performing an exhaustive evaluation of all possible combinations of choices for all of said plurality of adapters in response to said maximum number of possible combinations of choices being less than said predetermined large number.

3. The method of configuring a data processing system to optimally allocate system resources among a plurality of adapters installed therein according to claim 1, wherein said predetermined large number equals 8,800.

4. The method of configuring a data processing system to optimally allocate system resources among a plurality of adapters installed therein according to claim 1, wherein said selected portion of said maximum number of possible random combinations equals said predetermined large number.

5. The method of configuring a data processing system to optimally allocate system resources among a plurality of adapters installed therein according to claim 1, wherein said selected portion of said maximum number of possible random combinations of choices are selected such that there is a high probability that a choice for a first of said plurality of adapters is not equal to a choice for a subsequent one of said plurality of adapters.

6. A system for configuring a data processing system to optimally allocate system resources among a plurality of adapters installed therein, each of said plurality of adapters having a plurality of choices associated therewith specifying selected system resources utilizable by an associated adapter, said system comprising:

means for determining the maximum number of possible combinations of choices for all of said plurality of adapters;

means for examining only a selected portion of said maximum number of possible random combinations of choices in response to said maximum number of possible combinations of choices exceeding a predetermined large number;

means for analyzing said selected portion of said maximum number of possible random combinations of choices; and means for selecting an optimum allocation of system resources from said selected portion of said maximum number of possible random combination of choices.

7. The system for configuring a data processing system to optimally allocate system resources among a plurality of adapters installed therein according to claim 6, further including means for performing an exhaustive evaluation of all possible combinations of choices for all of said plurality of adapters in response to said maximum number of possible combinations of choices being less than said predetermined large number.

8. The system for configuring a data processing system to optimally allocate system resources among a plurality of adapters installed therein according to claim 6, wherein said predetermined large number equals 8,800.

9. The system for configuring a data processing system to optimally allocate system resources among a plurality of adapters installed therein according to claim 6, wherein said selected portion of said maximum number of possible random combinations equals said predetermined large number.

10. A method of configuring memory allocation within a data processing system for a plurality of adapters installed therein, each of said plurality of adapters having a plurality of choices associated therewith specifying selected memory allocations utilizable by an associated adapter, said method comprising the steps of:

determining the maximum number of possible combinations of choices for all of said plurality of adapters;

examining only a selected portion of said maximum number of possible random combinations of choices in response to said maximum number of possible combinations of choices exceeding a predetermined large number;

analyzing said selected portion of said maximum number of possible random combinations of choices; and selecting an optimum allocation of memory from said selected portion of said maximum number of possible random combinations of choices.

11. The method of configuring memory allocation within a data processing system for a plurality of adapters installed therein according to claim 10, further including the step of performing an exhaustive evaluation of all possible combinations of choices for all of said plurality of adapters in response to said maximum number of possible combinations of choices being less than said predetermined large number.

12. The method of configuring memory allocation within a data processing system for a plurality of adapters installed therein according to claim 10, wherein said predetermined large number equals 8,800.

13. The method of configuring memory allocation within a data processing system for a plurality of adapters installed therein according to claim 10, wherein said selected portion of said maximum number of possible random combinations equals said predetermined large number.

14. The method of configuring memory allocation within a data processing system for a plurality of adapters installed therein according to claim 10, wherein said selected portion of said maximum number of possible random combinations of choices are selected such that there is a high probability that choice for a first of said plurality of adapters is not equal to a choice for a subsequent one of said plurality of adapters.

15. The method of configuring memory allocation within a data processing system for a plurality of adapters installed therein according to claim 10, wherein said step of selecting an optimum allocation of memory from said selected portion of said maximum number of possible random combinations of choices further comprises the step of selecting an allocation of memory from said selected portion of said maximum number of possible random combinations of choices which includes a maximum number of sixteen kilobyte pages of free memory remaining within system memory after said allocation.

16. A system for configuring memory allocation within a data processing system for a plurality of adapters installed therein, each of said plurality of adapters having a plurality of choices associated therewith specifying selected memory allocations utilizable by an associated adapter, said system comprising:

means for determining the maximum number of possible combinations of choices for all of said plurality of adapters;

means for examining only a selected portion of said maximum number of random possible combinations of choices in response to said maximum number of possible combinations of choices exceeding a predetermined large number;

means for analyzing said selected portion of said maximum number of possible random combinations of choices; and means for selecting an optimum allocation of memory from said selected portion of said maximum number of possible random combinations of choices.

17. The system for configuring memory allocation within a data processing system for a plurality of adapters installed therein according to claim 16, further including means for performing an exhaustive evaluation of all possible combinations of choices for all of said plurality of adapters in response to said maximum number of possible combinations being less than said predetermined large number.

18. The system for configuring memory allocation within a data processing system for a plurality of adapters installed therein according to claim 16, wherein said predetermined large number equals 8,800.

19. The system for configuring memory allocation within a data processing system for a plurality of adapters installed therein according to claim 16, wherein said selected portion of said maximum number of possible random combinations equals said predetermined large number.

20. The system for configuring memory allocation within a data processing system for a plurality of adapters installed therein according to claim 16, wherein said means for selecting an optimum allocation of memory from said selected number of possible random combinations of choices further comprises means for selecting an optimum allocation of memory which includes a maximum number of sixteen kilobyte pages of free memory within system memory after said allocation.

* * * * *